United States Patent

Lorek et al.

[11] Patent Number: 6,041,826
[45] Date of Patent: Mar. 28, 2000

[54] PETROL SUPPLY TUBE

[75] Inventors: Serge Lorek, Pau; Olivier Denizart, Cauge; Daniel Siour, Maisons Laffitte, all of France

[73] Assignee: Elf Atochem S.A., Paris La Defense Cedex, France

[21] Appl. No.: 08/381,814

[22] PCT Filed: Jun. 1, 1994

[86] PCT No.: PCT/FR94/00640

§ 371 Date: Apr. 4, 1995

§ 102(e) Date: Apr. 4, 1995

[87] PCT Pub. No.: WO94/29626

PCT Pub. Date: Dec. 22, 1994

[30] Foreign Application Priority Data

Jun. 3, 1993 [FR] France ................... 93 06650
Aug. 13, 1993 [FR] France ................... 93 10097

[51] Int. Cl.[7] .................. F16L 11/04; F16L 9/14
[52] U.S. Cl. ............ 138/137; 138/140; 138/DIG. 7; 428/36.7
[58] Field of Search ............ 138/137, 124–126, 138/118, 140, 141; 428/36, 36.7, 36.6

[56] References Cited

U.S. PATENT DOCUMENTS

| | | | |
|---|---|---|---|
| 3,561,493 | 2/1971 | Maillard | 138/141 |
| 4,330,017 | 5/1982 | Satoh et al. | 138/126 |
| 4,436,778 | 3/1984 | Dugal | 428/36 |
| 4,613,532 | 9/1986 | Michel et al. | 428/36 |
| 5,038,833 | 8/1991 | Brunnhofer | 138/137 |
| 5,076,329 | 12/1991 | Brunnhofer | 138/137 |
| 5,164,258 | 11/1992 | Shida et al. | 428/319.3 |
| 5,219,003 | 6/1993 | Kerschbaumer | 138/137 |
| 5,284,184 | 2/1994 | Noone et al. | 138/137 X |
| 5,341,849 | 8/1994 | Mang | 138/133 |
| 5,383,087 | 1/1995 | Noone et al. | 138/137 X |
| 5,419,374 | 5/1995 | Nawrot et al. | 138/137 |
| 5,425,817 | 6/1995 | Mugge et al. | 138/137 |
| 5,439,454 | 8/1995 | Lo et al. | 138/137 X |
| 5,441,782 | 8/1995 | Kawashima et al. | 138/137 X |
| 5,449,024 | 9/1995 | Rober et al. | 138/137 |

*Primary Examiner*—Patrick Brinson
*Attorney, Agent, or Firm*—Pennie & Edmonds LLP

[57] ABSTRACT

Polyamide-based petrol supply tube, especially for engines, characterized in that it comprises an outer layer of polyamide, a middle layer of fluoropolymer, preferably of PVDF, and an inner layer of polyamide, these layers being respectively bonded to each other by layers of adhesive bonding agent.

8 Claims, No Drawings

PETROL SUPPLY TUBE

TECHNICAL FIELD

The present invention relates to a pipe for conveying or feeding petrol, in particular in engines, particularly motor vehicle engines. The pipe which is the subject of the invention is a polyamide-based petrol supply tube.

For safety reasons and to protect the environment, motor vehicle manufacturers impose mechanical characteristics on petrol pipes: strength and flexibility, and characteristics of increased resistance to permeability. The pipes must be as impervious as possible to petroleum products and to their additives, in particular methanol.

PRIOR ART

At present, polyamide pipes are commonly employed in the motor vehicle industry. Polyamides represent an ideal material for this pipe application, their mechanical strength being excellent and their flexibility being sufficient for a pipe to withstand, without breaking, the accumulation of flexural motions practically throughout the life of a vehicle. These polyamide pipes no longer meet the new requirements of the motor vehicle manufacturers where permeability is concerned. With the ever increasing presence of methanol in petrol, the sensitivity of polyamide pipes is reflected in a swelling of the pipe resulting in a decrease in the mechanical properties and dimensional changes.

DESCRIPTION OF THE INVENTION

The objective of the present invention is therefore to overcome these disadvantages while preserving the mechanical properties of the polyamides.

Thus, the present invention provides a polyamide-based petrol supply tube comprising an outer layer of polyamide, a middle layer of fluoropolymer, preferably of PVDF, and an inner layer of polyamide, these layers being respectively bonded to each other by layers of adhesive bonding agent.

The subject of the invention is therefore a pipe consisting of five layers made up respectively of PA/bonding agent/fluoropolymer/bonding agent/PA (PA meaning polyamide).

These pipes are particularly suitable for feeding petrol to engines.

The polyamide employed is usually a thermoplastic aliphatic polyamide and especially a polyamide 11 (PA-11), polyamide 12 (PA-12) or polyamide 12,12 (PA-12,12), plasticized or otherwise, or else a polyamide 6 (PA-6) or polyamide 6,6 (PA-6,6). The polyamide may optionally be a product modified to withstand impacts, or a copolymer. The polyamides of the outer and inner layers may be identical or different. Each polyamide layer may consist of one or a number of sublayers, each of these sublayers consisting of a different polyamide.

This polyamide may also contain conventional fillers for polyamides. The quantity of filler which is incorporated is itself also conventional and is a function of the specification of the motor vehicle manufacturers. One or both polyamide layers may contain such fillers.

According to an embodiment, this filler consists of a regrind. This term "regrind" refers to the ground product of a pipe misshapen during the manufacturing process, and therefore unsuitable for the application for which it is intended, which is thus recycled. It is therefore possible to grind up these misshapen pipes and to incorporate them into the inner and/or outer layer.

Among the fluoropolymers according to the invention there may be mentioned:

vinylidene fluoride (VF2) homo- and copolymers, trifluoroethylene (VF$_3$) homo- and copolymers, homo- and copolymers, and especially terpolymers, combining residues of chlorotrifluoroethylene (CTFE), tetrafluoroethylene (TFE), hexafluoropropene (HFP) and/or ethylene units and optionally VF2 and/or VF3 units. By way of example there may be mentioned polytetrafluoroethylene (PTFE) and poly(ethylene-tetrafluoroethylene) (ETFE).

A fluoropolymer is also intended to mean mixtures of at least 70% by weight of the above with other polymers.

Among the fluoropolymers those advantageously employed are the vinylidene fluoride homo- and copolymers containing at least 70% by weight of VF2 residues, referred to as PVDF throughout the text. PVDF is also intended to mean mixtures of the above with at least one other thermoplastic polymer, provided that at least 50% by weight of VF2 units is present in the mixture.

Each layer of fluoropolymer may be made up of one or a number of sublayers, each of these sublayers being made up of a different fluoropolymer.

It is found that such a pipe, consisting of a middle layer of PVDF bonded by an adhesive bonding agent to two outer and inner layers of polyamide makes it possible to reduce the permeability by a factor of at least 10 when compared with that of an equivalent polyamide pipe, while maintaining the other properties, such as the cold impact strength, within the specification limits of the motor vehicle manufacturers.

In order to ensure the adhesion between the polyamide and the fluoropolymer, a polymer containing carbonyl groups in its polymer chain is employed in a known manner, such as a polyurethane, a polyamide, a polyurea, a polyester, a copolymer which has ethylene-carbon monoxide groups or else their copolymer derivatives or their mixtures.

Fluoropolymer may be mixed with this adhesive bonding agent in a proportion of 1 to 50% by weight. When the bonding agent also contains fluoropolymer it is preferred that the fluoropolymer present in the bonding agent should be the same as that which is in the adjacent fluoropolymer layer(s).

Other thermoplastic polymers or copolymers may also be incorporated into this adhesive bonding agent, provided that the adhesive bonding agent is present in a proportion of at least 50% by weight in the mixture. The adhesive bonding agents of the layers situated, on the one hand, between the outer polyamide layer and the fluoropolymer layer and, on the other hand, between the inner polyamide layer and the fluoropolymer layer may be identical or different. Each layer of bonding agent may consist of one or more sublayers, each of these sublayers consisting of a different bonding agent.

Additional layers may be added both inside and outside the pipe. Such layers may consist of polymers, of sheaths and the like, of colouring additives, of anti-UV agent, antioxidant and, in general, any layer known in the art and which can be added to a polyamide layer.

According to an embodiment, the thickness of the polyamide layers is between 0.3 and 1.8 mm, the thickness of the fluoropolymer layer is between 10 $\mu$m and 1 mm and the thickness of the layers of adhesive bonding agent is between 10 $\mu$m and 1 mm.

The thicknesses of the layers of polyamides and of bonding agents may be identical or different. Such thicknesses of the constituents are appropriate for the manufacture of petrol feed pipes for engines the diameter of which is generally between 6 and 12 mm.

It is essential, in fact, that the fluoropolymer, and especially the PVDF, should be bonded efficiently to the polyamide. A pipe which does not exhibit bonding between the fluoropolymer and the polyamide cannot have a good flexibility and consequently cannot be folded or bent into an elbow easily by hot forming; in this case the thinnest material forms creases during the operation.

Furthermore, if the layers do not adhere to one another, possible condensation of gases between two fluoropolymer/polyamide layers can, in time, result in the deformation of the thinnest part of the pipe. Furthermore, since the pipes are connected to each other, and to the petrol tank and to the carburettor by couplings, the latter cannot ensure leaktightness if they bear on separated layers. Finally, in the case where the fluoropolymer is PVDF and when the thickness of the PVDF layer inside the pipe is very small, for example from 10 to a few tens of µm, and without adhesion, a partial vacuum in the pipe deforms the polyvinylidene fluoride film irreversibly, making the pipe unusable.

The invention also relates to pipes which are identical with the above but of larger diameter. They are suitable, for example, for connecting the buried petrol storage tank and the service station pump.

The pipe according to the invention is obtained in a known manner by coextrusion of the five components under known extrusion conditions which are appropriate to each of the thermoplastic materials. Coextrusion of the five components facilitates the extrusion of the middle fluoropolymer layer, especially of PVDF, which is relatively difficult when this layer is not "sandwiched".

METHODS OF EMBODYING THE INVENTION

The following examples illustrate the invention without limiting it.

EXAMPLE 1

A pipe of 8 mm external diameter, obtained in a conventional manner in a five-substance coextrusion plant, is made up of:

an outer layer of PA-12 plasticized with 13% on a mass basis of n-butylbenzenesulphonamide (BBSA) 600 µm in thickness, a layer 150 µm in thickness of a bonding agent consisting of a mixture of:
65 parts by weight of thermoplastic polyurethane of polyester type with a Shore A hardness measured according to DIN standard 53-505 equal to 88 and with a relative density of 1.18,
35 parts by weight of an ethylene/vinyl acetate copolymer functionalized by grafting with maleic anhydride with a melting point of 90° C. and melt flow of 6 g/10 min at 190° C. under 2.16 kg, a layer of PVDF which is a VF2 homopolymer with melt flow of 8 g/10 min at 230° C. under 5 kg, 250 µm in thickness, a 150 µm layer of a bonding agent identical with the bonding agent employed above;

an inner layer of 500 µm of PA-12 identical with the polyamide 12 employed above for the outer layer.

This pipe thus obtained exhibits a very low permeability to leaded premium petrol containing 15% of methanol; this pipe exhibits good mechanical properties.

EXAMPLE 2

A PA/bonding agent/PVDP/bonding agent/PA pipe calibrated to the following dimensions: outer diameter 8 mm and inner diameter 6 mm, is produced by coextrusion.

By way of comparison, a single-layer polyamide pipe identical with the above pipe, 1 mm in thickness, is extruded.

The polyamide employed is a PA-12 plasticized with 7.5% on a mass basis of n-butylbenzene-sulphonamide (BBSA) which has a flexural modulus of 450 MPa (ISO standard 178) and a notched Charpy impact strength of 9 kJ/m$^2$ at −40° C.(ISO standard 179).

The bonding agent is a mixture obtained by extruding in a twin-screw extruder

PVDF No. 1 VF2 homopolymer with a melt flow of 13 g/10 min at 230° C. under 5 kg (ISO standard 1133) (50 mass %), a copolymer of acrylic-imide type containing the following units 1, 2, 3 and 4 in its structure:

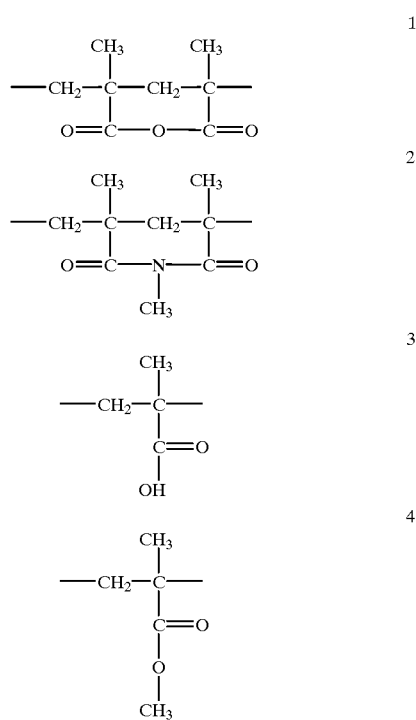

the weight percentage (expressed in relation to the total mass of copolymers) of the acidic and anhydrous monomers 1 and 3 is between 3 and 6% and the weight percentage of the imide monomers 2 is equal to 66%, the weight percentage (expressed in relation to the total mass of copolymers) of the imide monomers 2 is between 3 and 6%, the said copolymer exhibiting a flexural modulus of 4,100 MPa (ISO standard 178) (15%), and an impact modifier of the methyl methacrylate butadiene styrene (MBS) core-shell type (35%).

The PVDF No. 2 of the middle layer is a VF2 homopolymer with a melt flow of 8 g/10 min at 230° C. under 5 kg (ISO standard 1133).

The impact strength and the permeability are measured for each of the pipes in a test petrol.

The standard employed for assessing the impact strength of the pipes is DIN standard 53453. The tests are conducted at −40° C.

The permeability tests are conducted according to the "micro SHED test" method by recirculating test petrol in the pipes. The test petrol is:

TF1, mixture on a volume basis of ethanol (9%), isooctane (45.5%) and toluene (45.5%). In this case the recirculation is performed at 40° C. at a pressure of 2 bars.

| Example | Pipe structure | Permeability TFI ($g/m^2/24$ h) | DIN impact at $-40°$ C. |
| --- | --- | --- | --- |
| 2 | PA-12/bonding agent/PVDF No. 2/bonding agent/PA-12 (380 μm/65 μm/100 μm/ 65 μm/380 μm) | <5 | 0F/10 |
| Comparative | PA-12 (1 mm) | 69.7 | 0F/10 |

0F/10 = No failure out of 10 tests according to the standard.

What is claimed is:

1. A petrol supply tube comprising five concentric layers wherein the innermost layer comprises polyamide, the outermost layer comprises polyamide, the middle layer comprises fluoropolymer, and two layers of adhesive bonding agent polymers or copolymers that contain carbonyl groups in their polymer chains are situated respectively between said middle layer and said innermost and outermost layers.

2. The petrol supply tube of claim 1 wherein the fluoropolymer is polyvinylidende fluoride.

3. The petrol supply tube of claim 1 wherein the polyamides are independently selected from the group consisting of PA-12, PA-12,12, PA-11, PA-6, and PA-6,6.

4. The petrol supply tube of any one of claims 1 to 3, wherein at least one of said inner layer and said outer layer further comprises filler.

5. The petrol supply tube of claim 4 wherein the filler is a "regrind".

6. The petrol supply tube of any one of claims 1 to 3, wherein the inner layer has a thickness of between 0.3 mm and 1.8 mm, the layer of adhesive bonding agent between the inner layer and the middle layer has a thickness of between 10 μm and 1 mm, the middle layer has a thickness of between 10 μm and 1 mm, the layer of adhesive bonding agent between the middle layer and the outer layer has a thickness of between 10 μm and 1 mm, and the outer layer has a thickness of between 0.3 mm and 1.8 mm.

7. A method of feeding petrol to an engine that comprises causing said petrol to flow from a source of petrol through a petrol feed pipe in accordance with any one of claims 1 to 3 and into said engine.

8. A method of making a petrol supply tube in accordance with any one of claims 1 to 3 which comprises coextruding said inner, outer, middle, and two adhesive layers.

* * * * *